United States Patent
Hall et al.

(10) Patent No.: US 11,943,386 B2
(45) Date of Patent: Mar. 26, 2024

(54) CALL GRAPHS FOR TELECOMMUNICATION NETWORK ACTIVITY DETECTION

(71) Applicant: AT&T Intellectual Property I, L.P., Atlanta, GA (US)

(72) Inventors: Elijah Hall, Plano, TX (US); Prince Paulraj, Coppell, TX (US); Ana Armenta, San Jose, CA (US); Surya Murali, San Jose, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 266 days.

(21) Appl. No.: 17/566,886

(22) Filed: Dec. 31, 2021

(65) Prior Publication Data
US 2023/0216968 A1 Jul. 6, 2023

(51) Int. Cl.
*H04M 15/00* (2006.01)
*G06N 5/022* (2023.01)
*H04M 3/22* (2006.01)

(52) U.S. Cl.
CPC ........ *H04M 15/58* (2013.01); *G06N 5/022* (2013.01); *H04M 3/2281* (2013.01); *H04M 15/41* (2013.01); *H04M 15/47* (2013.01)

(58) Field of Classification Search
None
See application file for complete search history.

(56) References Cited

U.S. PATENT DOCUMENTS

| | | | |
|---|---|---|---|
| 6,850,606 B2* | 2/2005 | Lawyer | H04M 15/58 379/114.03 |
| 10,257,591 B2* | 4/2019 | Gaubitch | H04M 7/1295 |
| 10,902,327 B1* | 1/2021 | Yalov | G06N 20/00 |
| 10,999,298 B2* | 5/2021 | Eisen | G06Q 30/0609 |
| 11,228,676 B1* | 1/2022 | Karachevtsev | G06F 9/541 |
| 11,310,360 B2* | 4/2022 | Hochberg | H04M 3/382 |
| 2017/0111515 A1* | 4/2017 | Bandyopadhyay | H04W 12/128 |
| 2017/0222960 A1* | 8/2017 | Agarwal | G06Q 10/107 |

OTHER PUBLICATIONS

Goyal, P., et al., "Graph Embedding Techniques, Applications, and Performance: A Survey", Knowledge Based Systems, Dec. 27, 2017, 18 pages, arXiv: 1705.02801v4.
(Continued)

*Primary Examiner* — Quoc D Tran (57) ABSTRACT

A processing system may maintain a communication graph that includes nodes representing a plurality of phone numbers including a first phone number and edges between the nodes representing a plurality of communications between the plurality of phone numbers and may generate at least one vector via a graph embedding process applied to the communication graph, the at least one vector representing features of at least a portion of the communication graph. The processing system may then apply the at least one vector to a prediction model that is implemented by the processing system and that is configured to predict whether the first phone number is associated with a type of network activity associated with a telecommunication network and may implement a remedial action in response to an output of the prediction model indicating that the first phone number is associated with the type of network activity.

20 Claims, 5 Drawing Sheets

300

| | Low | Med | High |
|---|---|---|---|
| High | High Low<br>0.01%<br>Ex: PIN authenticator | High Med<br>0.01%<br>Ex: Insurance or Bank | High High<br>0.02%<br>Ex: Unknown |
| Med (Call Volume) | Med Low<br>1.69% | Med Med<br>0.21% | Med High<br>0.22%<br>Ex: Rotating Spoofers |
| Low | Low Low<br>94.15%<br>Ex: Normal behaviors | Low Med<br>3.69%<br>Ex: Live Number Probers | Low High<br>Ex: Live Number Probers |

Risk (56) References Cited

OTHER PUBLICATIONS

Kung-Hsiang., H., "A Gentle Introduction to Graph Neural Networks (Basics, DeepWalk, and GraphSage)." Towards Data Science, Feb. 10, 2019, accessed from https://towardsdatascience.com/a-gentle-introduction- to-graph-neural-network-basics-deepwalk-and-graphsage-db5d540050b3, 10 pages.

Hamilton, W., et al., "Inductive Representation Learning on Large Graphs", $31^{st}$ Conference on Neural Information Processing Systems, (NIPS 2017), 19 pages.

"Graph Embedding", Chapter 4, accessed on Nov. 22, 2021 from https://cse.msu.edu/~mayao4/dig_book/chapters/chapter4.pdf, 32 pages.

* cited by examiner

CALL GRAPHS FOR TELECOMMUNICATION NETWORK ACTIVITY DETECTION

The present disclosure relates generally to telecommunication network operations and machine learning model deployment, and more particularly to methods, computer-readable media, and apparatuses for identifying a phone number associated with a type of network activity via application of a vector generated via a graph embedding process applied to a communication graph as an input to a prediction model.

BACKGROUND

Machine learning in computer science is the scientific study and process of creating algorithms based on data that perform a task without any specific instructions. These algorithms are called models and different types of models can be created based on the type of data that the model takes as input and also based on the type of task (e.g., prediction, classification, or clustering) that the model is trying to accomplish. The general approach to machine learning involves using the training data to create the model, testing the model using the cross-validation and testing data, and then deploying the model to be used by real-world applications.

SUMMARY

In one example, the present disclosure describes a method, computer-readable medium, and apparatus for identifying a phone number associated with a type of network activity via application of a vector generated via a graph embedding process applied to a communication graph as an input to a prediction model. For instance, in one example, a processing system including at least one processor may maintain a communication graph that includes nodes representing a plurality of phone numbers including a first phone number and edges between the nodes representing a plurality of communications between the plurality of phone numbers and may generate at least one vector via a graph embedding process applied to the communication graph, the at least one vector representing features of at least a portion of the communication graph. The processing system may then apply the at least one vector to a prediction model that is implemented by the processing system and that is configured to predict whether the first phone number is associated with a type of network activity associated with a telecommunication network and may implement a remedial action in response to an output of the prediction model indicating that the first phone number is associated with the type of network activity.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses methods, non-transitory (i.e., tangible or physical) computer-readable storage media, and apparatuses for identifying a phone number associated with a type of network activity via application of a vector generated via a graph embedding process applied to a communication graph as an input to a prediction model. In particular, examples of the present disclosure generate graphical representations of the data connecting call records, text message records (e.g., records for Short Message Service (SMS) and/or multimedia message service (MMS) messages), and/or account data (e.g., subscriber identity data). For instance, the present disclosure may generate a network graph relating to subscriber/user and activity in a telecommunication network. The scale of this data may easily exceed 100 GB per day. In addition, additional data formats may be generated from such a network graph for various use cases associated with fraud and threat activity on the telecommunication network, such as for robocalling detection and blocking, hotlist generation, fraud ring detection, spoofing detection, social engineering detection, and feature generation for use in other models.

In one example, the present disclosure may incorporate the concept of a trusted edge between two telephone numbers (or "customer telephone numbers" (CTNs)) which is an aggregated edge between two nodes that utilizes one or more defined thresholds to establish a "trusted" relationship between two CTNs. In addition, in one example, the concept of a trusted edge may be used to aggregate a large time window of behavioral data (e.g., calling and messaging data), allowing the network graph to condense a large amount of data into a fraction of the original size. In addition, trusted edges may be used to define or generate a sub-graph that serves as a base for a shorter time window of raw data (e.g., non-aggregated calling and/or messaging data) to then be added to the network graph for more time sensitive use cases. Once this data is combined, the present disclosure may further apply a graph embedding process to generate one or more vectors (e.g., "embeddings"), representing one or more portions/aspects of the network graph, and may further set labels for a given use case to make predictions (e.g., using one or more prediction models, such as machine learning models (MLMs), regression models, or the like). For instance, in the case of detecting social engineering calls, the present disclosure may utilize a set of known events (e.g., social engineering calls, normal calls, and/or unknown calls) to train a prediction model. In one example, embeddings or other features of the network graph may be associated with known events/labels and used as training and/or testing input data for one or more prediction models for various prediction tasks. In one example, the present disclosure may include prediction models for prediction, or classification tasks. For instance, a prediction model may be trained to determine whether a CTN is associated with robocalling activity (or not). Alternatively, or in addition, a prediction model may be trained to predict whether a particular call is a robocall and/or a type of robocall (or robocaller) (e.g., a non-malicious robocall/robocaller, a malicious robocall/robocaller, etc.), a threat level of the robocall/robocaller (e.g., high, medium, low), and so forth. Examples of non-malicious robocalls may include a bank informing customers that monthly statements are now available for access, a city informing residents of a trash pickup schedule change, etc., a governmental agency sending out daily reminders of upcoming appointments for a next day, etc. In one example, the present disclosure may also generate sequences of behaviors that may lead to fraud events. These sequences can be extracted for prediction models to be trained for learning fraud behaviors. An example is a communication can be made in which a series of text messages are received/sent between a device of a malicious actor and a target device to retrieve personal information, obtain a one-time personal identification number (PIN), obtain password reset notification links used to take control of the victim's account, and so forth.

Many systems for telecommunication network fraud and threat detection utilize call detail records (CDRs) and similar data sets. Responsible personnel may perform various feature engineering procedures and pre-analysis for respective prediction models, rule-based threat detection, and so forth. This kind of repeated use can incur large processing costs in terms of time as well as compute resources. For instance, simple joins to evaluate multiple hop connections can be time consuming and expensive. In addition, there may be many versions of rolling aggregated tables for these types of features, adding to the time and complexity of feature processing. In contrast, examples of the present disclosure provide both a long-term and short-term perspective of connections between CTNs held in memory so that many use cases and models can leverage these relationships and extract many other types of features as prediction model inputs that might otherwise be cost prohibitive (e.g., with regard to time, compute resources, and/or monetary costs). In addition, wider patterns that are traditionally harder to describe such as robocalling behaviors and how they evolve throughout the network, may be identified with greater ease and speed as compared to prior approaches, such as using table-based data sets. Advantageously, robocalling detection in real-time or near-real time may provide numerous benefits to customers and a network operator, such as saving customers from potential costly social engineering attacks, or blocking devices and accounts associated with robocalling or other threat activities to the network, thereby preventing additional customers from being affected and freeing network resources for other beneficial and non-malicious uses, and so forth.

In recent decades fraudulent activities across telecommunication networks, and cellular networks in particular, have increased. Often, an entire ring of individuals collaborates on the effort. Working together, these fraudsters can inflict much greater losses on victims. It is therefore important to identify such fraudulent behaviors and the associated fraud rings to reduce or prevent repeated fraud occurrences. Examples of the present disclosure detect, or help in detecting high risk phone calls, relationships, and sequences of activities. Using a call graph, examples of the present disclosure may identify potentially high risk phone calls, such as robocalls and/or spoofed-number calls, and may collect hot lists, identify fraud rings, and so forth. For instance, using a call graph for a given time range, CTN activity may be aggregated to identify behavioral patterns.

With these patterns, the present disclosure may define a relationship between two CTNs numbers using historical call records. In addition, graph features may be quickly collected over communication records (e.g., CDRs or the like) in helping to identify useful statistics that may identify normal call behaviors on a given number (and conversely, that may be used to identify phone numbers that do not behave normally, e.g., outliers). These outliers can be classified for any number of network threat detection cases.

To illustrate, it has been observed that extremely low or excessively high usage occurs on known fraud-related phone numbers compared to non-fraud-related phone numbers for a period of time prior to an occurrence of a fraud event (e.g., 30-90 days, two weeks, etc.). In one example, metrics such as the number of calls in/out, minutes of talk time in/out, and the number of text messages in/out, or the like are stored as node and/or edge information in a communication graph, and may be used as features for evaluation, e.g., classification/prediction of threat activity regarding a particular communication and/or a particular phone number. In one example, a communication graph may be constructed to represent communications between a fraud-related phone number and other phone numbers that have occurred over a certain period of time. A hot-list of phone numbers in the graph may then serve as a "warning signal" when a customer walks into a retail store of the telecommunication network seeking account upgrades, a new phone or other endpoint devices, a change to the authorized user of an account or an addition of another authorized user, etc.

In one example, a given phone number, "A", may be of interest, and a communication graph may be constructed to represent communications that occurred in the past 'N' days between A and a set of other numbers $B_i$ i∈N, where N may be 14 days, 30 days, 60 days, one month, two months, etc. Once the graph is constructed, a sub-graph may be extracted representing a set of numbers $B_j$ j∈N and j<=i, which represents high-risk phone numbers. This sub-graph may then be used for various purposes, such as detecting robocall-associated numbers and related behaviors, identifying calls that are high risk spoof events and alerting order fulfillment services when they align with significant account events, such as an upgrade or an account change (e.g., changing or adding an authorized user), identifying fraud rings and understanding their behaviors, alerting for sales of new or added mobile phone lines in an existing or newly established account, where a port-in number is specified (e.g., in the case where the customer is porting a number from another carrier), black-listing certain port-in numbers (or specifying elevated risks for such port-in numbers), alerting authorities about suspicious call messaging or other network activities, and so forth. These and other aspects of the present disclosure are discussed in greater detail below in connection with the examples of FIGS. 1-5.

Figure 1:
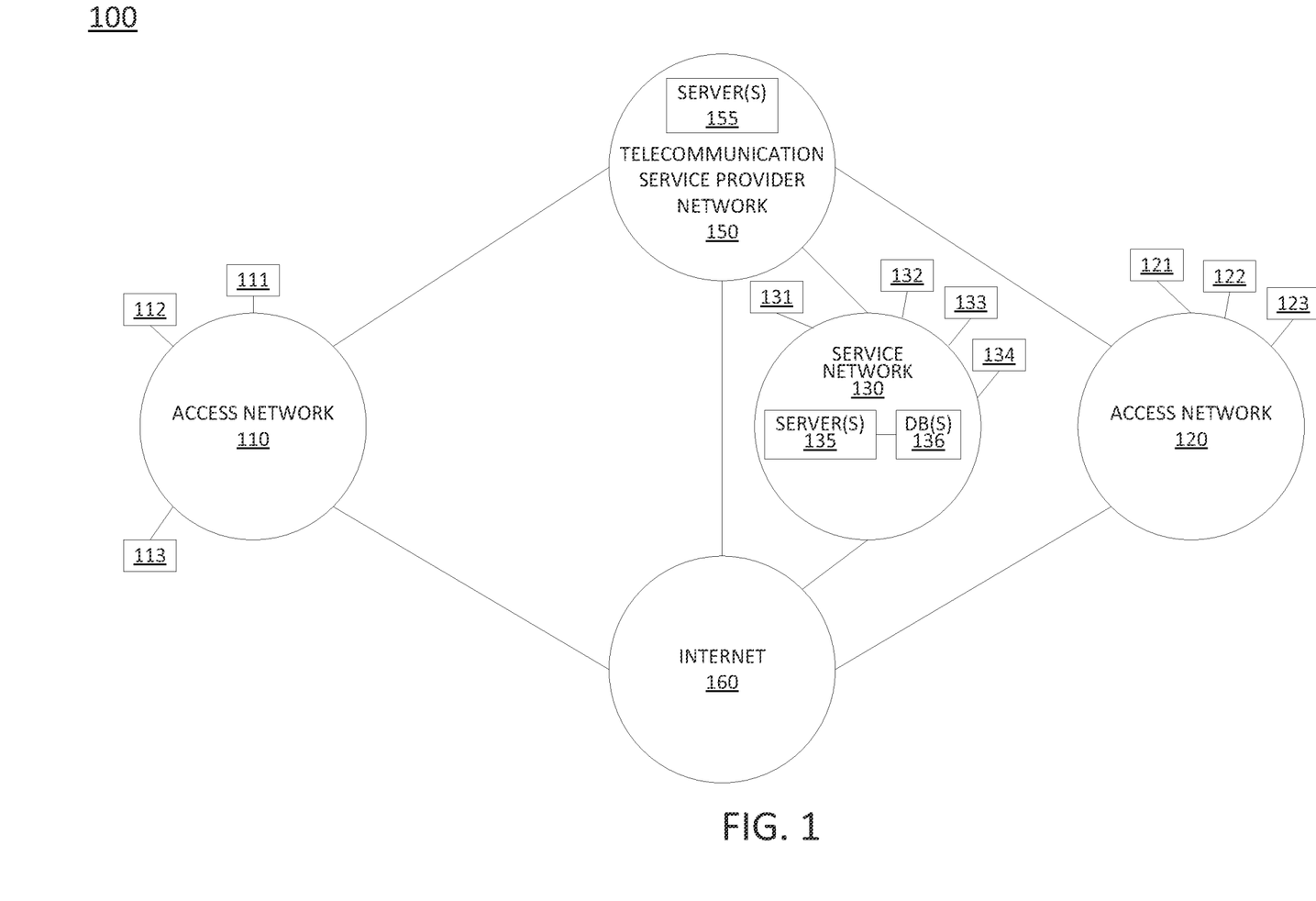
FIG. 1 illustrates one example of a system related to the present disclosure.

To aid in understanding the present disclosure, FIG. 1 illustrates an example system 100 comprising a plurality of different networks in which examples of the present disclosure may operate. Telecommunication service provider network 150 may comprise a core network with components for telephone services, Internet services, and/or television services (e.g., triple-play services, etc.) that are provided to customers (broadly "subscribers"), and to peer networks. In one example, telecommunication service provider network 150 may combine core network components of a cellular network with components of a triple-play service network. For example, telecommunication service provider network 150 may functionally comprise a fixed-mobile convergence (FMC) network, e.g., an IP Multimedia Subsystem (IMS)

network. In addition, telecommunication service provider network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication service provider network 150 may also further comprise a broadcast television network, e.g., a traditional cable provider network or an Internet Protocol Television (IPTV) network, as well as an Internet Service Provider (ISP) network. With respect to television service provider functions, telecommunication service provider network 150 may include one or more television servers for the delivery of television content, e.g., a broadcast server, a cable head-end, a video-on-demand (VoD) server, and so forth. For example, telecommunication service provider network 150 may comprise a video super hub office, a video hub office and/or a service office/central office.

In one example, telecommunication service provider network 150 may also include one or more servers 155. In one example, the servers 155 may each comprise a computing device or system, such as computing system 500 depicted in FIG. 5, and may be configured to host one or more centralized and/or distributed system components. For example, a first system component may comprise a database of assigned telephone numbers, a second system component may comprise a database of basic customer account information for all or a portion of the customers/subscribers of the telecommunication service provider network 150, a third system component may comprise a cellular network service home location register (HLR), e.g., with current serving base station information of various subscribers, and so forth. Other system components may include a Simple Network Management Protocol (SNMP) trap, or the like, a billing system, a customer relationship management (CRM) system, a trouble ticket system, an inventory system (IS), an ordering system, an enterprise reporting system (ERS), an account object (AO) database system, and so forth. In addition, other system components may include, for example, a layer 3 router, a short message service (SMS) server, a voicemail server, a video-on-demand server, a server for network traffic analysis, and so forth. It should be noted that in one example, a system component may be hosted on a single server, while in another example, a system component may be hosted on multiple servers in a same or in different data centers or the like, e.g., in a distributed manner. For ease of illustration, various components of telecommunication service provider network 150 are omitted from FIG. 1.

In one example, access networks 110 and 120 may each comprise a Digital Subscriber Line (DSL) network, a broadband cable access network, a Local Area Network (LAN), a cellular or wireless access network, and the like. For example, access networks 110 and 120 may transmit and receive communications between endpoint devices 111-113, endpoint devices 121-123, and service network 130, and between telecommunication service provider network 150 and endpoint devices 111-113 and 121-123 relating to voice telephone calls, communications with web servers via the Internet 160, and so forth. Access networks 110 and 120 may also transmit and receive communications between endpoint devices 111-113, 121-123 and other networks and devices via Internet 160. For example, one or both of the access networks 110 and 120 may comprise an ISP network, such that endpoint devices 111-113 and/or 121-123 may communicate over the Internet 160, without involvement of the telecommunication service provider network 150. Endpoint devices 111-113 and 121-123 may each comprise a telephone, e.g., for analog or digital telephony, a mobile device, such as a cellular smart phone, a laptop, a tablet computer, etc., a router, a gateway, a desktop computer, a plurality or cluster of such devices, a television (TV), e.g., a "smart" TV, a set-top box (STB), and the like. In one example, any one or more of endpoint devices 111-113 and 121-123 may represent one or more user devices (e.g., subscriber/customer devices) and/or one or more servers of one or more third parties, such as a credit bureau, a payment processing service (e.g., a credit card company), an email service provider, and so on.

In one example, the access networks 110 and 120 may be different types of access networks. In another example, the access networks 110 and 120 may be the same type of access network. In one example, one or more of the access networks 110 and 120 may be operated by the same or a different service provider from a service provider operating the telecommunication service provider network 150. For example, each of the access networks 110 and 120 may comprise an Internet service provider (ISP) network, a cable access network, and so forth. In another example, each of the access networks 110 and 120 may comprise a cellular access network, implementing such technologies as: global system for mobile communication (GSM), e.g., a base station subsystem (BSS), GSM enhanced data rates for global evolution (EDGE) radio access network (GERAN), or a UMTS terrestrial radio access network (UTRAN) network, among others, where telecommunication service provider network 150 may provide service network 130 functions, e.g., of a public land mobile network (PLMN)-universal mobile telecommunications system (UMTS)/General Packet Radio Service (GPRS) core network, or the like. In still another example, access networks 110 and 120 may each comprise a home network or enterprise network, which may include a gateway to receive data associated with different types of media, e.g., television, phone, and Internet, and to separate these communications for the appropriate devices. For example, data communications, e.g., Internet Protocol (IP) based communications may be sent to and received from a router in one of the access networks 110 or 120, which receives data from and sends data to the endpoint devices 111-113 and 121-123, respectively.

In this regard, it should be noted that in some examples, endpoint devices 111-113 and 121-123 may connect to access networks 110 and 120 via one or more intermediate devices, such as a home gateway and router, an Internet Protocol private branch exchange (IPPBX), and so forth, e.g., where access networks 110 and 120 comprise cellular access networks, ISPs and the like, while in another example, endpoint devices 111-113 and 121-123 may connect directly to access networks 110 and 120, e.g., where access networks 110 and 120 may comprise local area networks (LANs), enterprise networks, and/or home networks, and the like.

In one example, the service network 130 may comprise a local area network (LAN), or a distributed network connected through permanent virtual circuits (PVCs), virtual private networks (VPNs), and the like for providing data and voice communications. In one example, the service network 130 may be associated with the telecommunication service provider network 150. For example, the service network 130 may comprise one or more devices for providing services to subscribers, customers, and/or users. For example, telecommunication service provider network 150 may provide a cloud storage service, web server hosting, and other services. As such, service network 130 may represent aspects of telecommunication service provider network 150 where infrastructure for supporting such services may be deployed.

In one example, the service network 130 links one or more devices 131-134 with each other and with Internet 160, telecommunication service provider network 150, devices accessible via such other networks, such as endpoint devices 111-113 and 121-123, and so forth. In one example, devices 131-134 may each comprise a telephone for analog or digital telephony, a mobile device, a cellular smart phone, a laptop, a tablet computer, a desktop computer, a bank or cluster of such devices, and the like. In an example where the service network 130 is associated with the telecommunication service provider network 150, devices 131-134 of the service network 130 may comprise devices of network personnel, such as customer service agents, sales agents, marketing personnel, or other employees or representatives who are tasked with addressing customer-facing issues and/or personnel for network maintenance, network repair, construction planning, and so forth.

In the example of FIG. 1, service network 130 may include one or more servers 135 which may each comprise all or a portion of a computing device or processing system, such as computing system 500, and/or a hardware processor element 502 as described in connection with FIG. 5 below, specifically configured to perform various steps, functions, and/or operations for identifying a phone number associated with a type of network activity via application of a vector generated via a graph embedding process applied to a communication graph as an input to a prediction model, as described herein. For example, one of the server(s) 135, or a plurality of servers 135 collectively, may perform operations in connection with the example process of graph generation/maintenance of FIG. 2 and/or the example method 400 of FIG. 4, or as otherwise described herein. In one example, the one or more of the servers 135 may comprise an artificial intelligence (AI)/machine learning (ML)-based service platform (e.g., a network-based and/or cloud-based service hosted on the hardware of servers 135).

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 5 and discussed below) or multiple computing devices collectively configured to perform various steps, functions, and/or operations in accordance with the present disclosure.

In one example, service network 130 may also include one or more databases (DBs) 136, e.g., physical storage devices integrated with server(s) 135 (e.g., database servers), attached or coupled to the server(s) 135, and/or in remote communication with server(s) 135 to store various types of information in support of systems for identifying a phone number associated with a type of network activity via application of a vector generated via a graph embedding process applied to a communication graph as an input to a prediction model, as described herein. As just one example, DB(s) 136 may be configured to receive and store network operational data collected from the telecommunication service provider network 150, such as call logs, mobile device location data, control plane signaling and/or session management messages, data traffic volume records, call detail records (CDRs), message detail records (e.g., regarding SMS or MMS messages), error reports, network impairment records, performance logs, alarm data, and other information and statistics, which may then be compiled and processed, e.g., normalized, transformed, tagged, etc., and forwarded to DB(s) 136, via one or more of the servers 135. In one example, server(s) 135 and/or DB(s) 136 may comprise cloud-based and/or distributed data storage and/or processing systems comprising one or more servers at a same location or at different locations. For instance, DB(s) 136, or DB(s) 136 in conjunction with one or more of the servers 135, may represent a distributed file system, e.g., a Hadoop® Distributed File System (HDFS™), or the like.

In one example, DB(s) 136 may be configured to receive and store records from customer, user, and/or subscriber interactions, e.g., with customer facing automated systems and/or personnel of a telecommunication network service provider (e.g., the operator of telecommunication service provider network 150). For instance, DB(s) 136 may maintain call logs and information relating to customer communications which may be handled by customer agents via one or more of the devices 131-134. For instance, the communications may comprise voice calls, online chats, emails, etc., and may be received by customer agents at devices 131-134 from one or more of devices 111-113, 121-123, etc. The records may include the times of such communications, the start and end times and/or durations of such communications, the touchpoints traversed in a customer service flow, results of customer surveys following such communications, any items or services purchased, the number of communications from each user, the type(s) of device(s) from which such communications are initiated, the phone number(s), IP address(es), etc. associated with the customer communications, the issue or issues for which each communication was made, etc. Alternatively, or in addition, any one or more of devices 131-134 may comprise an interactive voice response system (IVR) system, a web server providing automated customer service functions to subscribers, etc. In such case, DB(s) 136 may similarly maintain records of customer, user, and/or subscriber interactions with such automated systems. The records may be of the same or a similar nature as any records that may be stored regarding communications that are handled by a live agent.

Similarly, any one or more of devices 131-134 may comprise a device deployed at a retail location that may service live/in-person customers. In such case, the one or more devices 131-134 may generate records that may be forwarded and stored by DB(s) 136. The records may comprise purchase data, information entered by employees regarding inventory, customer interactions, surveys responses, the nature of customer visits, etc., coupons, promotions, or discounts utilized, and so forth. In this regard, any one or more of devices 111-113 or 121-123 may comprise a device deployed at a retail location that may service live/in-person customers and that may generate and forward customer interaction records to DB(s) 136. For instance, such a device (e.g., a "personnel device") may comprise a tablet computer in which a retail sales associate may input information regarding a customer and details of the transaction, such as identity and contact information provided by the customer (e.g., a name, phone number, email address, mailing address, etc.), desired items (e.g., physical items, such as smart phones, phone cases, routers, tablet computers, laptop computers, etc., or service items, such as a new subscription or a subscription renewal, a type of subscription (e.g., prepaid, non-prepaid, etc.), an agreement duration (e.g., a one-year contract, a two-year contract, etc.), add-on services (such as additional data allowances, international calling plans, and so forth), discounts to be applied (such as free phone upgrades and/or subsidized phone upgrades, special group discounts, etc.), and so on. In such case, information entered and/or obtained via such personnel devices may be forwarded to server(s) 135 and/or DB(s) 136 for processing and/or storage. As such, DB(s) 136, and/or server(s) 135 in conjunction with DB(s) 136, may comprise a retail inventory management knowledge base. In addition, DB(s) 136 and/or server(s) 135 in conjunction with DB(s) 136 may comprise an account management system. For instance, information regarding subscribers' online and in-store activities may also be included in subscriber account records (e.g., in addition to contact information, payment information, information on current subscriptions, authorized users, duration of contract, etc.).

In one example, DB(s) 136 may alternatively or additionally receive and store data from one or more third parties. For example, one or more of endpoint devices 111-113 and/or 121-123 may represent a server, or servers, of a consumer credit entity (e.g., a credit bureau, a credit card company, etc.), a merchant, or the like. In such an example, DB(s) 136 may obtain one or more data sets/data feeds comprising information such as: consumer credit scores, credit reports, purchasing information and/or credit card payment information, credit card usage location information, and so forth. In one example, one or more of endpoint devices 111-113 and/or 121-123 may represent a server, or servers, of an email service provider, from which DB(s) 136 may obtain email address service information (e.g., high-level information, such as the date that the email address was created and/or an age or approximate age of the email address since it was created, a mailing address and/or phone number (if any) that is associated with the email address (and if the third party is permitted to provide such information in accordance with the email address owner's permissions). Such information may then be leveraged in connection with email addresses that may be provided by customers during in-person transactions at telecommunication network service provider retail locations. Similarly, one or more of the endpoint devices 111-113 and/or 121-123 may represent a server, or servers, of one or more merchants or other entities (such as entities providing ticketed sporting events and/or concerts, email mailing lists, etc.), from which DB(s) 136 may obtain additional email address information (e.g., email address utilization information).

In one example, DB(s) 136 may store a communication graph in which nodes represent phone numbers and edges between the nodes represent communications/relationships between respective pairs of phone numbers during a given time period (such as two weeks, 30 days, one month, 60 days, two months, 90 days, etc.). In one example, the edges may comprise aggregated edges or may represent multiple communications between respective pairs of phone numbers during the time period. For instance, phone numbers A and B may have several calls within the last 30 days, which may be represented by a single edge. In addition, the edges may be weighted edges and may include various additional data, such as a number of calls, the number of calls initiated by A, the number of calls initiated by B, the average call duration (or average call durations for calls from A to B and calls from B to A, respectively), and so forth. In one example, the edges may also represent messages, e.g., SMS/text messages, MMS messages, or the like, between pairs of phone numbers. For instance, an edge may also include data regarding a number of messages exchanged between phone numbers A and B during the time period, the number of messages from A to B and from B to A, respectively, the average message size (e.g., in terms of data size, such as the number of bytes or the like, or in terms of a number of characters, etc.), an average inter-message interval, and so forth. It should be noted that the edges may also represent communications between two phone numbers that are both participants in one or more multi-party calls or multi-party messages. In addition, the edges may indicate a number of multi-party messages and/or multi-party calls that are initiated by respective ones of the phone numbers A and B, and those in which the phone numbers A and B are merely recipients/participants.

Each node may also include additional information regarding a phone number, such as an account number, the date an account was opened and/or an age of the account, an account holder name, an account mailing address, and so forth. Alternatively, or in addition, the communication graph may comprise a sub-graph of a k-partite/multi-partite graph in which at least one additional sub-graph may relate to account information (e.g., an "identity graph"). For instance, the communication graph may incorporate data from subscriber account records such as described above. In one example, the edges may also include "short-term" edges. For instance, aggregated edges or edges representing aggregated call and/or messaging data between respective pairs of phone numbers may store long-term perspective information (e.g., for a past two weeks, 30 days, 60 days, etc.). However, short-term perspective edges may comprise edges representing individual calls and/or messages within a shorter time period, e.g., within a past 24 or 48 hours, or the like. Thus, the communication graph may efficiently store and represent a long-term perspective of relationships between phone numbers, while also providing a short-term perspective on calls and/or messages at an individual communication level. It should be noted that these edges representing individual calls and/or messages may also be weighted and contain additional data, such as a type of communication (e.g., call or message), an initiator of the communication (e.g., phone number A or phone number B associated with the nodes connected by the edge), a duration of the call or size of the message, and so forth.

In one example, DB(s) 136 may store various prediction models (e.g., AI/ML-based prediction models) for various tasks. For instance, a prediction model may be trained to determine whether a telephone number is associated with robocalling activity (or not). Alternatively, or in addition, a prediction model may be trained to predict whether a particular call is a robocall and/or a type of robocall (or robocaller) (e.g., a non-malicious robocall/robocaller, a malicious robocall/robocaller, etc.), a threat level of the robocall/robocaller (e.g., high, medium, low), and so forth.

It should be noted that as referred to herein, a prediction model may include a machine learning model (MLM) (or machine learning-based model), e.g., a machine learning algorithm (MLA) that has been "trained" or configured in accordance with input data (e.g., training data) to perform a particular service, e.g., to detect whether a phone number is or is not associated with robocalling activity, to identify/predict whether a particular communication is or is not a robocall, to classify a category or robocaller or type of robocall (e.g., beneficial, benign, malicious, or similar categorizations), to classify a risk/threat level of a robocaller or a particular robocall (e.g., high, medium, low risk), etc., to detect fraud and/or to provide a fraud indicator, or value indicative of a likelihood of fraud, to detect spoofed number calling, and so forth. Examples of the present disclosure may incorporate various types of MLAs/models that utilize training data, such as support vector machines (SVMs), e.g., linear or non-linear binary classifiers, multi-class classifiers, deep learning algorithms/models, such as deep learning neural networks or deep neural networks (DNNs), generative adversarial networks (GANs), decision tree algorithms/ models, k-nearest neighbor (KNN) clustering algorithms/ models, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. In one example, a robocalling classification, fraud detection, or other MLMs of the present disclosure may be in accordance with a MLA/MLM from an open source library, such as OpenCV, which may be further enhanced with domain specific training data. In an illustrative example, a robocalling detection MLM or fraud detection MLM of the present disclosure may comprise a gradient boosted machine (GBM).

In one example, DB(s) 136 may also store training data and/or testing data that may be used to train and verify the accuracy of a prediction model for robocalling detection and/or classification, for fraud detection, and so forth (broadly, a "network activity detection machine learning model") as described herein. For instance, server(s) 135 may apply a graph embedding process (e.g., graph2vec, or the like) to the communication graph to extract one or more vectors, or "embeddings," which may represent the graph overall or at least a portion of the communication graph (e.g., a sub-graph relating to a given node associated with a particular phone number and two or three hops away from the phone number). Various vectors/embeddings may then be used as training data for training a prediction model.

It should be noted that in one example, a prediction model may take an embedding/vector as input(s). In one example, the prediction model may also take the graph itself, a sub-graph thereof, or one or more features extracted directly from the graph or derived from the graph, as an additional input or inputs. In such case, a "set of input factors" may include an embedding/vector and the graph (or sub-graph), or other features extracted/derived therefrom. In addition, labels may be added to at least a portion of a plurality of sets of input factors (e.g., labels of "robocaller" or "not robocaller" (and/or "unknown," labels of "not robocaller," "beneficial robocaller," "malicious robocaller," etc., labels of "fraud" or "no fraud") as stored in DB(s) 136. In one example, the graph embedding process is learned/trained as part of the prediction model (e.g., where the extracted graph features and/or dimensionality of the vector(s)/embedding(s) is optimized for the specific task of the prediction model) or is trained as a separate process from the prediction model (e.g., guided graph embedding, where dimensionality of vector(s) and/or other hyperparameters is/are provided. Alternatively, dimensionality may be based upon selected loss criteria (e.g., an allowable level/percentage of loss of information)).

Operations of server(s) 135 for identifying a phone number associated with a type of network activity via application of a vector generated via a graph embedding process applied to a communication graph as an input to a prediction model, and/or server(s) 135 in conjunction with one or more other devices or systems (such as DB(s) 136) are further described below in connection with the examples of FIGS. 2 and 3. In addition, it should be realized that the system 100 may be implemented in a different form than that illustrated in FIG. 1, or may be expanded by including additional endpoint devices, access networks, network elements, application servers, etc. without altering the scope of the present disclosure. As just one example, any one or more of server(s) 135 and DB(s) 136 may be distributed at different locations, such as in or connected to access networks 110 and 120, in another service network connected to Internet 160 (e.g., a cloud computing provider), in telecommunication service provider network 150, and so forth.

In addition, it should be understood that other aspects of the system 100 may be omitted from illustration in FIG. 1. As just one example, the system 100 may include a data distribution platform such as Apache Kafka, or the like, for obtaining sets/streams of data from telecommunication network service provider data source(s) (e.g., server(s) 155, devices 131-134, or the like) and third party data source(s) (e.g., endpoint devices 111-113, endpoint devices 121-123, or the like). The system 100 may also incorporate in-stream processing, such as preprocessing of raw data for ingestion into a graph/graph database stored by DB(s) 136 and/or for input into a prediction model via server(s) 135. For example, the server(s) 135 and/or DB(s) 136, as well as upstream data sources, may be deployed on one or more instances of Apache Flink, or the like, as part of and/or in association with the Kafka streaming platform. In addition, the prediction model(s), the graph embedding processes, and so forth may be trained within and/or may operate on such a platform. For instance, the server(s) 135 and/or DB(s) 136 may comprise an instance of Apache Spark, e.g., on top of Hive and Hadoop Distributed File System (HDFS), or similar arrangement. Thus, these and other aspects are all contemplated within the scope of the present disclosure.

Figure 2:
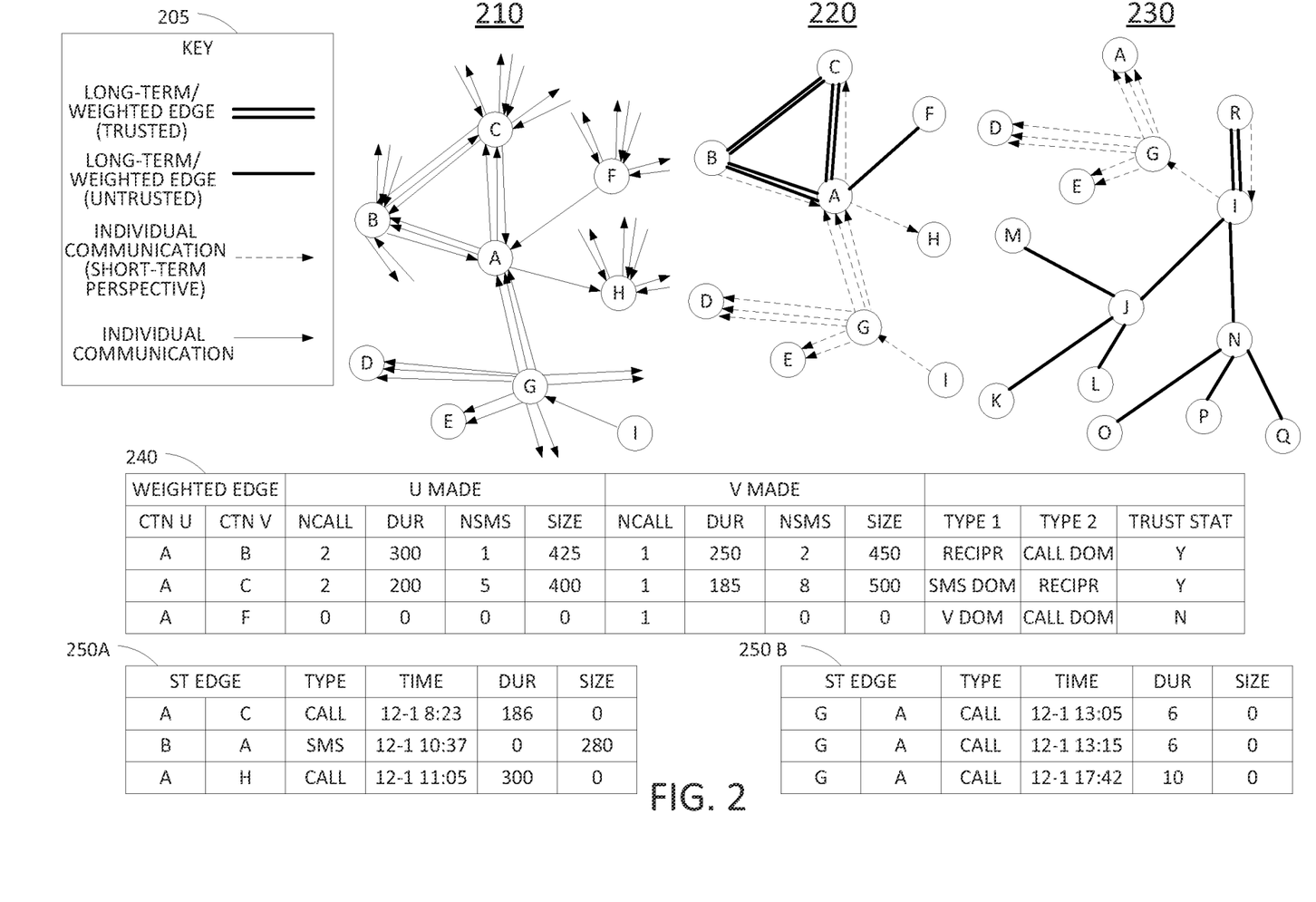
FIG. 2 illustrates an example of constructing a communication graph with long-term and short-term perspectives, and example edge information records, in accordance with the present disclosure.

FIG. 2 illustrates an example of constructing a communication graph with long-term and short-term perspectives, and example edge information records, in accordance with the present disclosure. In one example, the construction and maintenance of the communication graph and the storage of the communication graph may be implemented via a processing system comprising one or more physical devices and/or components thereof, such as a server or a plurality of servers, a database system, and so forth. For instance, various aspects of the example(s) of FIG. 2 may be provided via components as illustrated FIG. 1, such as server(s) 135 and/or DB(s) 136, or the like.

In one example, graph 210 may comprise a k-partite pseudograph, G(V,E), where E is the set of all directed edges allowing for duplicates with different creation times, such as (u,v,t) and (v,u,t). Graph 220 may comprise a reduction of the graph 210 to a weighted simple monopartite graph G'(V',M), where the vertices V is a subset of V and M is a set of aggregated edges. For instance, each aggregated edge may be represented as (u,v,m), where m is the multiplicity of that edge between u and v and is undirected. In one example, the edge may be further represented as (u,v,m,n, o,p,r,s) where (m,n,o,p,r,s) are aggregated features that are used to additionally define the relationship between u and v.

For instance, table 240 illustrates several examples of aggregated edges, e.g., between nodes/vertices A and B, between A and C, and between A and F. In each case, the aggregated edges are defined by the nodes/vertices (e.g., representing respective telephone numbers/CTNs) and additional features (e.g., (m, n, o, p, r, s, . . . )) such as a number of calls made by each CTN to the other CTN ("ncall"), an average duration and/or a total duration of such calls ("dur"), a number of messages sent by each CTN to the other CTN ("nsms"), an average message size and/or a total data volume of all of the messages ("size"), etc. In one example, the additional features may include the top two predominant types to define the relationship, which may be selected from among a defined set of possible types, such as reciprocal ("recipr"), which is characterized by a relative balance between communications from u to v and from v to u, "v dominant" ("v dom"), which is characterized as the communications being predominantly from v to u (and similarly for "u dominant" or ("u dom"), call dominant ("call dom")), which is characterized by the communications being predominantly calls (e.g., as opposed to text messages), and similarly for "text dominant" (or "SMS dom"), and so forth.

It should be noted that the graph 210 illustrates one-hop communications from node A, (e.g., a node representing telephone number A) to nodes B, C, F, G, and H (e.g., representing telephone numbers B, C, F, G, and H). In addition, some (but not all) second-hop nodes/telephone numbers are illustrated in the graph 210, such as nodes/telephone numbers D, E, and I. Other second-hop nodes/telephone numbers such as those representing communications with nodes/telephone numbers B, C, F, and H are omitted from the example of FIG. 2 for ease of illustration. In addition, it should be noted that a limited number of edges representing a limited number of individual communications between telephone numbers are illustrated in the graph 210. For instance, only three edges representing three communications between telephone number A (node A) and telephone number C (node C) are illustrated in the graph 210. However, it should be understood that in a time period of interest, such as 30 days, 60 days, etc., there may be many more communications between telephone numbers, especially when there is a trusted relationship, such as communications between close family members. In one example, the present disclosure may maintain a larger communication graph for numerous phone numbers of subscribers and/or non-subscribers of a telecommunication network, such as for all phone numbers sharing a particular area code, phone numbers sharing a same NPA-NXX, phone numbers associated with accounts in a particular state, or the like, and so forth (where multiple graphs may be maintained for different groupings), or even for an entire subscriber base. For instance, in one example, graph 210 may represent a subgraph of a much larger graph.

Graph 220 illustrates that some of the edges in graph 210 are aggregated into and represented by aggregated edges (illustrated as solid lines in graph 220). Notably, these aggregated edges may maintain a long-term perspective of phone number-to-phone number communications and relationships, e.g., over 2 weeks, 30 days, 60 days, etc. Additional information defining aggregated edges are illustrated in table 240 and described above.

In addition, some of the aggregated edges may further be defined as "trusted edges," illustrated by double solid lines in graph 220. For instance, a relationship between two phone numbers may be designated as "trusted" when each party includes the other in a phone contact list, a social media contact list, or the like, when there is demonstrated bidirectional communications over a certain time period that exceeds a threshold volume of calls, duration of calls, number of messages, and/or volume of messages (where the certain time period may be the same time period over which the long-term perspective is captured by aggregated edges, or which may be a longer time period, such as 6 months, etc.). In one example, a relationship between two phone numbers may be designated as "trusted" based on a weighted combination of any or all of these above factors. In one example, an account status of either or both parties may comprise a factor or factors in such a trust designation (e.g., a relationship is more likely to be correctly designated as "trusted" when both parties are on post-paid plans and have had identities verified in-person at a retail location to establish respective accounts), and so forth. Thus, in any case, some edges/relationships may be designated as trusted, while others are not. For instance, A, B, and C may be family members with numerous communications and may thus have "trusted edges" between nodes A and B, B and C, and A and C.

Notably, an aggregated edge is shown between A and F, but this is not trusted. For example, sometime in the past 30 days, a doctor may have used telephone number F to call telephone number A to confirm an upcoming scheduled annual physical exam. Graph 220 also includes edges providing a short-term perspective of relevant communications, e.g., a past hour, a past 24 hours, a past 48 hours, or the like. For instance, the dotted lines in graph 220 may represent individual communication and are directed edges. Tables 250A and 250B, for example, illustrates edge data for individual communications to and from phone number A (node A) for the given short-term time period (e.g., a past 24 hours, or the like). For instance, the edge data may include a type of communication (e.g., call or text/SMS message), and a duration (if a call) or a size (e.g., a data size/volume, if a text message). Notably, table 250B illustrates three short duration calls from telephone number G to telephone number A, all between 1:00 PM and 6:00 PM on December 1, which may be indicative of robocalling, especially in the absence of a trusted relationship or any other communications between A and G.

It should be noted that the data source(s) for the initial graph 210 may comprise call detail records (CDRs) of a telecommunication network. In one example, CDRs may be collected and/or maintained in separate databases for voice calls and for other messages (MMS or SMS). For a particular telecommunication network, these data sources may include CDRs for calls originated and/or terminated with phone numbers of subscribers/customers of the telecommunication network. For example, the daily call volume may exceed 2 billion calls and the daily message volume may exceed three billion messages per day for more than 200 million unique phone numbers. The total data size/volume of such records may exceed 120 GB in compressed parquet format. This means an average month of data may comprise approximately 3.6 TB. Simple aggregations in a data cluster (such as Apache Spark, or the like) may be possible via multiple joins. However, it could take days to perform such processing. Additionally, it may be desirable to join additional data sets for additional features for use in prediction models, such as account numbers to generate account level features, higher level relationships, e.g., account-to-account relationships, which can inform lower level relationships phone number-to-phone number, and so forth. Since accounts change, some data cleaning/screening filters and parameters may therefore need to be set when using larger windows of behavior. For instance, if accounts change, then a network operator may use the activation date as a dynamic filter for aggregation. Thus, adding additional data sources further increases the complexity of preparing data for input to prediction models.

In contrast, with an aggregated graph, such as graph 220 of FIG. 2, the size/volume of stored data is drastically reduced. This allows a network operator to hold much longer time ranges of data and overlay recent events such as the last hour of calls, the last 24 hours of calls, or the like. In one example, the short-term edges are non-weighted. In one example, this recent activity may be compared to historical trends for signal detection. In addition, with enough data, these signals can be used to train a prediction model (or may be used as additional input features for model training and live predictions/classifications, or the like).

In one example, graph embeddings may also be generated from the aggregated graph 220, also referred to as a weighted network graph, to generate additional features. For instance, the graph 220 is similar to language knowledge graphs in that each phone number is analogous to a word, and the order, frequency, and count of unique nodes in a subgraph are important information that are captured in the embedding space. Thus, in one example, each phone number may be treated as a word. In addition, examples of the present disclosure may use graph2vec or other embedding techniques to generate unique embeddings/vectors. In one example, the embeddings/vectors may also be merged with the features on the weighted graph (e.g., graph 220) as complementary inputs to a prediction model, such as for robocalling detection, fraud detection, or the like. It is again noted that the present examples build a long-term perspective, while using a short-term perspective to generate additional features, and additionally generate derived features, such as graph embeddings.

To further illustrate, in one example, using any or all of these features, a prediction model may be trained and deployed to classify a phone number with respect to robocalling. For instance, there may be two main objectives for robocalling detection: to identify the phone numbers that are likely robocallers and to detect the call events themselves. In accordance with the present disclosure, trusted relationships between telephone numbers are indicated in the edge data, where such a relationship exits. Conceptually robocallers mostly have outgoing calls and little or no incoming calls. In addition, if trust is defined as a reciprocal relationship, then robocallers have little or no calls with other phone numbers in a trusted relationship.

In one example, features that are used for robocalling detection may include short-term features (e.g., one day features), such as outgoing call count, incoming call count, and/or incoming/outgoing call ratio. Features that are used for robocalling detection may also include long-term features (e.g., features aggregated over 30-day or 60-day time periods, or the like), such as (for each relationship in the graph) the identities of the parties, the number of calls, the average call duration and/or overall time on calls, a number of messages, an average message size and/or total message data size/volume, and an indication of whether the relationship is trusted or untrusted. For instance, for a given phone number that is being evaluated for robocaller/not robocaller categorization, the long-term features may be collected with respect to at least the edges/relationships/communications of the given phone number with other phone numbers. The features that are used for robocalling detection may also include combined features derived from a graph (such as graph 220), such as: trusted outgoing call count, untrusted outgoing call count, and/or trusted/untrusted call (or messaging) ratio(s).

In one example, some or all of the features for robocalling detection may be obtained from a graph embedding process, such as discussed above. In other words, the above features may comprise a vector or "embedding" derived from graph 220. Alternatively, or in addition, features may be extracted from graph 220 itself. For instance, a vector/embedding may be derived for long-term features, while short term features may be extracted from edges in the graph 220 via node traversal, or the like.

In one example, using any or all of these features, a prediction model may be trained and deployed to classify a phone number with respect to robocalling across two perspectives: call volume and risk. For instance, "risk" in the present context may be defined as a ratio of new calls made to phone numbers where no standing relationship exists (e.g., "cold calls"). For instance "risk" may be a function of overall outgoing call count, outgoing trusted call count, and incoming call count for a subject telephone number. In one example, each "perspective," or robocalling categorization, may have three levels, giving a label with nine distinct values, e.g., High_High to Low_Low.

Figure 3:
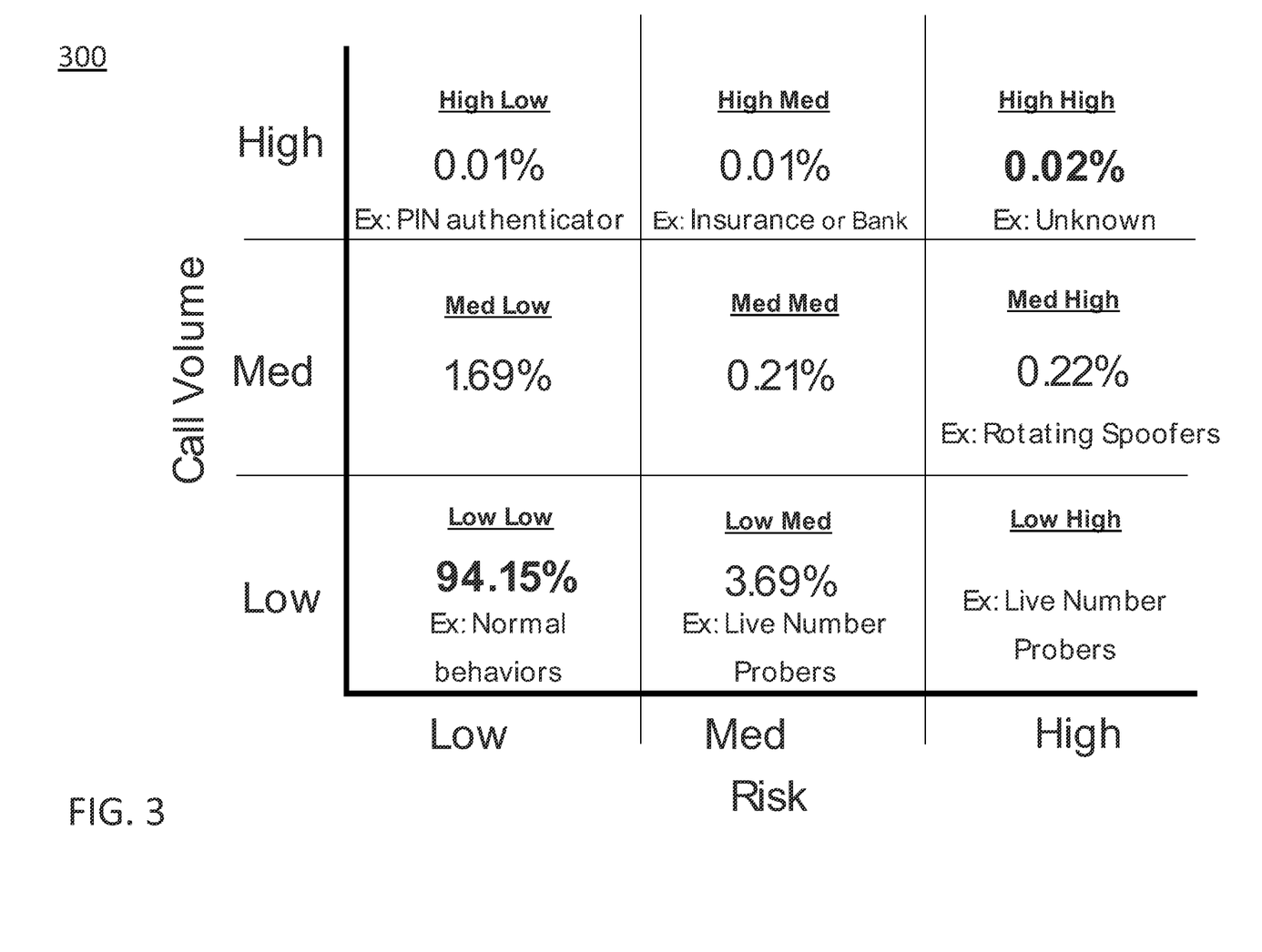
FIG. 3 illustrates an example of robocalling label descriptions, in accordance with the present disclosure.

To illustrate, FIG. 3 depicts an example of robocalling label descriptions 300. FIG. 3 also provides an example percentage distribution of telephone numbers by label type, and some examples of behaviors or caller types for each category. For instance, a high volume caller with low risk may be a personal identification number (PIN) authenticator service that places a high volume of calls (e.g., each time a user with two-factor authentication seeks to access the service, an automated call may be made to a user's telephone number (or similarly a text message)). As another example, a medium risk-high volume caller may be an insurance company or a bank that may place automated calls with monthly reminders of statement availability, balances due, billing due dates, etc. Other labels/categories may be associated with live number probers (malicious actors calling phone numbers just to see if a live person will answer; those having live answers may then be added to a list for further fraudulent activities) or rotating spoofers (e.g., malicious actors who spoof legitimate phone numbers and place a moderate volume of calls and/or messages before moving on to a next phone number to spoof). Using these labels on a communication graph, such as graph 210, the calls themselves can also be labeled as robocall/not robocall, and/or a particular category of robocalling.

It should be noted that the foregoing is just one example of how robocalling categories/labels may be defined and that in other, further, and different examples, more or less factors, different factors, and so forth may be used as the basis for defining risk, for example, for defining the cutoffs between "high," "medium," and "low" call volumes, and so on. For instance, additional features may include a ratio of a number of calls to a number of answered calls, a number of calling minutes versus outgoing trusted calls ratio, a trusted edge count, a repeat call count, a number of unique phone numbers contacted, a median inter-call duration, a count of unique area codes called, a percentage of call to a predominant area code (the area code to which a given phone number places the most calls), a clique size (e.g., a number of strongly connected nodes on the graph to which a given node/telephone number belongs), and so forth.

It should also be noted that in one example, features for more than one hop may be included in a vector/embedding as additional features from the graph are used for robocalling categorization, such as, for telephone numbers having a direct relationship with a given/subject phone number, features associated with relationships with other telephone numbers, etc. For instance, for a subject phone number G in graph 220, there may be a direct relationship with A. In addition, features may be derived from relationships between A and B, C, F, and/or H. As just one example, additional features may include a mean/average neighbor outgoing call count and/or a maximum neighbor outgoing call count (e.g., for one-degree neighbors of outgoing calls from a subject telephone number). For instance, with respect to the example of graph 220, if a subject telephone number is G, these additional metrics may include average and/or maximum outgoing calls counts for A, D, E, and I.

As an additional example, a prediction model may be trained for and deployed to categorize individual calls with respect to robocalling (e.g., is the call likely/not likely a robocall, a percentage likelihood or likelihood score of being a robocall, a suspected category of robocalling (e.g., such as selected from among the categories/labels of the example of FIG. 3), or the like). For instance, one of the edges in graph 220 between G and A may be evaluated for robocalling categorization via such a prediction model. The inputs to the model may be of the same or similar nature as discussed above, and may include one or more vector(s)/embedding(s) and/or features from the graph itself (e.g., without embedding).

As still another example, graph 230 illustrates an additional graph with long and short-term perspectives representing at least a portion of communications/relationships among telephone numbers associated with a telecommunication network. In one example, graph 230 may at least partially overlap with graph 220. For instance, graphs 220 and 230 may represent respective sub-graphs of a larger communication graph (e.g., graph 220 having a subject node A, and graph 230 having a subject node I). Notably, graph 230 may be used in evaluating node I with respect to robocalling or other fraudulent activities. In this case, graph 230 visually indicates from a long-term perspective that phone number I has relationships with phone numbers J and N, and a trusted relationship with node R, and from a short-term perspective that phone number I has had a recent call to node G and a recent call from node R. In this case, G may be a phone number that is used for robocalling (e.g., phone number G being the same as illustrated in graph 220). Notably, while phone number I is not used directly for robocalling, it may be associated with robocalling activity, such as being used as a command and control system for endpoint devices that are used for robocalling. For instance, nodes J and N may represent phone numbers J and N that were also used by a same person or entity for robocalling within the last 30 days. In this case, a graph embedding representing node I may pull-in data from one or two hops from node I, capturing these long-term features. In addition, additional features from one or two hops from the graph 230 may capture short term activities of node G that are indicative of robocalling. For instance, with respect to the example of graph 230, assuming the subject telephone number is I, these additional metrics may include average and maximum outgoing calls counts for G, J, and N. All of these features may be input to a prediction model, e.g., a gradient boosted machine (GBM) or the like, that is trained to categorize I with respect to whether the phone number is associated with robocalling activity.

This structured call graph framework can be expanded for additional use cases and prediction models. In any case, examples of the present disclosure provide faster access to these multiple sources of data, e.g., call and message records. In one example, data maintenance may all be in graph form, or in a combination using pipelines and a distributed data platform (such as Apache Spark) to aggregate raw data before ingestion into the graph. However once in a communication graph (which may also be referred to as a graph database), additional derived features, such as embeddings/vectors, may be efficiently generated and used in real-time or near-real time (e.g., in hours, as opposed to days in the case of joins on tables, or other data structures).

Figure 4:
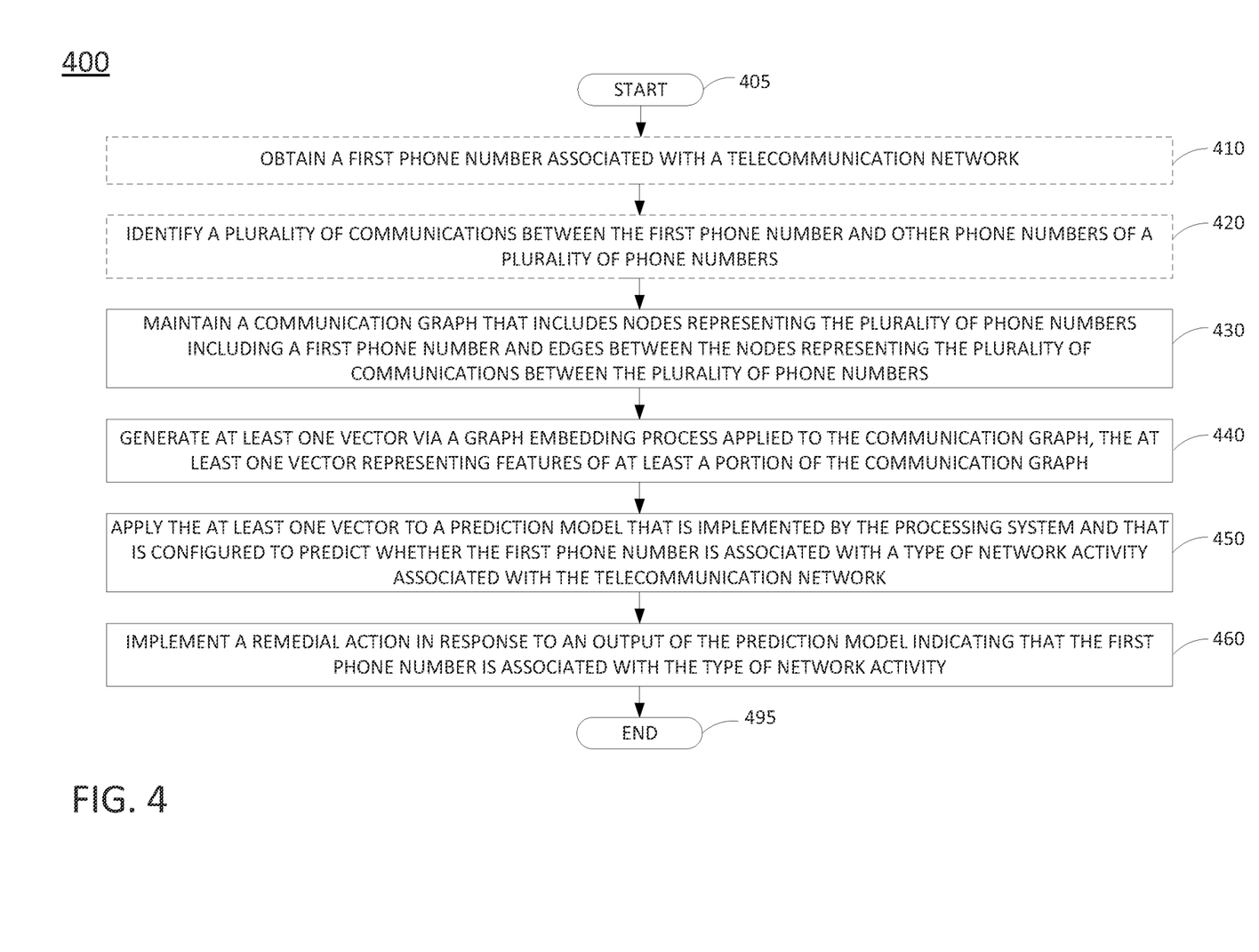
FIG. 4 illustrates a flowchart of an example method for identifying a phone number associated with a type of network activity via application of a vector generated via a graph embedding process applied to a communication graph as an input to a prediction model.

FIG. 4 illustrates an example flowchart of a method 400 for identifying a phone number associated with a type of network activity via application of a vector generated via a graph embedding process applied to a communication graph as an input to a prediction model. In one example, steps, functions, and/or operations of the method 400 may be performed by a device as illustrated in FIG. 1, e.g., one of servers 135. Alternatively, or in addition, the steps, functions and/or operations of the method 400 may be performed by a processing system collectively comprising a plurality of devices as illustrated in FIG. 1 such as one or more of server(s) 135, DB(s) 136, endpoint devices 111-113 and/or 121-123, devices 131-134, server(s) 155, and so forth. In one example, the steps, functions, or operations of method 400 may be performed by a computing device or processing system, such as computing system 500 and/or a hardware processor element 502 as described in connection with FIG. 5 below. For instance, the computing system 500 may represent at least a portion of a platform, a server, a system, and so forth, in accordance with the present disclosure. In one example, the steps, functions, or operations of method 400 may be performed by a processing system comprising a plurality of such computing devices as represented by the computing system 500. For illustrative purposes, the method 400 is described in greater detail below in connection with an example performed by a processing system. The method 400 begins in step 405 and may proceed to optional step 410, optional step 420, or step 430.

At optional step 410, the processing system may obtain a first phone number associated with a telecommunication network. The first phone number may be of a subscriber/customer of the telecommunication network, or may be a phone number of a non-subscriber, which may be used for communications with one or more phone numbers of subscribers/customers of the telecommunication network. The first phone number may be a phone number that is to be evaluated with respect to one or more types of network activity (e.g., robocalling (or "robotexting"), number spoofing, retail fraud, device hijacking for pay-per-call fraud, illegal or fraudulent call redirection, botnet activity, or the like, and so forth).

At optional step 420, the processing system may identify a plurality of communications between the first phone number and other phone numbers of a plurality of phone numbers (e.g., where the plurality of phone number includes the first phone number). For instance, the plurality of other phone numbers may be assigned to subscribers/customers or non-subscribers/non-customers of the telecommunication network. In one example, the plurality of communications may be identified from call detail records (CDRs) of the telecommunication network, or the like. The communications may include phone calls or text messages (which, as referred to herein, may include SMS and/or MMS messages). In one example, optional step 420 may also include identifying details of such communications, such as call duration, whether the call was answered/unanswered (which may or may not be indicated by the call duration), the caller and callee identities (e.g., the respective phone numbers), message size (e.g., in terms of data size/volume (e.g., a number of bytes, etc.)), and so forth.

At step 430, the processing system maintains a communication graph that includes nodes representing the plurality of phone numbers and edges between the nodes representing a plurality of communications between the plurality of phone numbers. In one example, step 430 may include generating the communication graph. In one example, step 430 may include generating a two-hop or a three-hop expansion of the communication graph from a node representing the first phone number. For instance, in one example, step 430 may include expanding the communication graph to include edges representing communications among the plurality of other phone numbers. In addition, in one example, step 430 may further include expanding the communication graph to include additional nodes representing additional phone numbers having communications with the plurality of other phone numbers and edges representing communications between the plurality of other phone numbers and the additional phone numbers. In one example, the communication graph may be a large graph representing all calls or a large portion of calls in the telecommunication network. For instance, the graph may be seeded with all phone numbers of a certain NPA-NXX (numbering plan area-central office code/exchange code), etc. Alternatively, or in addition, the communication graph may be a sub-graph of such a large graph. For instance, the graph (e.g., a sub-graph) may represent two or three hops from a subject node associated with a phone number of interest.

In accordance with the present disclosure, the edges may include edges representing aggregations of the plurality of communications among the plurality of phone numbers over a period of time (e.g., two weeks, 30 days, one month, 60 days, two months, etc.). In addition, in one example, step 430 may include aggregating communications of the plurality of communications between phone numbers associated with two nodes, and assigning at least one value to an edge between the two nodes based upon the aggregated communications (and similarly for other pairs of nodes/phone numbers). In one example, the aggregating may comprise aggregating edges (e.g., where a base graph or pseudo-graph is generated with edges representing individual communications, and then aggregating the edges to create one or more aggregated edges). The at least one value may be at least two values when phone calls and text messages are separately counted, and the value(s) may be indicative of the number of calls or text messages, the duration of time spent on calls, or the data size/volume or quantity of text/characters of text messages. In other words, edges thus created may comprise "weighted edges."

In one example, each edge (e.g., each aggregated edge) is labeled with a trusted status between two phone numbers represented by two nodes connected via the edge. For instance, the trusted status may be selected from among the labels of: trusted and untrusted. In one example, the trusted status of each edge may be assigned via one of: a manual labeling or a machine-learning based classification. In addition, in accordance with the present disclosure, the edges may include edges representing aggregated communications over the period of time between sets of two phone numbers associated with two of the nodes, and edges representing individual communications between the sets of two phone numbers over a shorter period of time. For instance, the period of time may comprise a past week, two weeks, one months, two months, three months, etc., and the shorter period of time may comprise a past hour, 6 hours, 24 hours, 48 hours, or the like.

At step 440, the processing system generates at least one vector via a graph embedding process applied to the communication graph, the at least one vector representing features of at least a portion of the communication graph. For instance, step 440 may be in accordance with a graph2vec algorithm or the like. In one example, the graph embedding process is trained as part of a prediction model for prediction/classification associated with a type of network activity. In another example, the graph embedding process is trained as a separate process from the prediction model to which the at least one vector may be used as an input. In one example, step 440 may comprise guided graph embedding, e.g., where a dimensionality of the vector(s) and/or other hyperparameters is/are provided. Alternatively, dimensionality may be based upon selected loss criteria (e.g., an allowable level/percentage of loss of information). In one example, the features and/or dimensionality of graph embedding may be optimized for a task of a prediction model to which the vector(s) will be applied (e.g., a prediction/classification task, such as classifying a phone number as robocaller/not robocaller, or a type of robocaller (or not robocaller), etc.). In one example, the at least one vector may encode information about at least one of the nodes (which may include information about relationships of the node, relationships of one-hop neighbors with additional nodes (e.g., two-hop neighbors, etc.)), or at least one of the edges between two of the nodes. In one example, the at least one vector may encode information about the communication graph overall.

In one example, the communication graph may comprise a monopartite graph that is projected from a k-partite graph comprising additional nodes of at least one type other than a phone number type. For instance, the k-partite graph may include sub-graphs comprising the communication graph and an identity graph. For instance, an identity graph may include additional details about a phone number, such as an identity of an account owner, account-to-account relationships, mailing address information, and so forth. In such an example, the at least one vector may encode information about the k-partite graph (e.g., including additional information from at least the identity graph or any other sub-graphs of the k-partite graph).

At step 450, the processing system applies the at least one vector to a prediction model that is implemented by the processing system and that is configured to predict whether the first phone number is associated with a type of network activity associated with the telecommunication network. The prediction model may comprise a machine learning model (MLM) or other prediction models, such as gradient boosted machine (GBM) or the like, a regression-based prediction model, and so forth. The prediction model may be "trained" or configured in accordance with input data (e.g., training data) to perform a particular service, e.g., to detect whether a phone number is or is not associated with robocalling activity, to identify/predict whether a particular communication is or is not a robocall, to classify a category or robocaller or type of robocall (e.g., beneficial, benign, malicious, or similar categorizations), to classify a risk/threat level of a robocaller or a particular robocall (e.g., high, medium, low risk), etc., to detect fraud and/or to provide a fraud indicator, or value indicative of a likelihood of fraud, to detect spoofed number calling, and so forth. For instance, the prediction model may be configured to generate an output comprising a classification/prediction (e.g., a binary classification, a multi-class classification, a score/value indicative of a degree of belonging to a particular class, or one or more classes, and/or a confidence score indicative of the output classification, etc.). The training data may include labeled input data sets, e.g., previously generated vectors/embeddings that may then be labeled with respect to one or more target prediction/classification categories and used as training data for training the prediction model. The labeled input data sets may also include additional features that may be extracted directly from the communication graph, or the communication graph itself (or a portion thereof) as discussed above, and labeled with respect to the one or more target categories. For instance, the graph or a sub-graph thereof may relate to a subject node/phone number and two hops away from the subject node, where the subject node may have a known categorization (such as a known robocaller and hence a labeled input data set for "robocaller").

In one example, step 450 may include applying at least a portion of the communication graph to the prediction model as at least one additional input. For instance, the prediction model may be trained to predict whether the first phone number is associated with a type of network activity associated with the telecommunication network in accordance with (1) the at least one vector and (2) the at least the portion of the communication graph. In other words, the prediction model may make predictions on graph embedding(s) (e.g., vector(s) generated via the graph embedding process), the graph itself (or at least a portion thereof, e.g., a sub-graph), or both.

In one example, the type of network activity may comprise a robocalling activity. In addition, in one example, the prediction model may be configured to output a category associated with the robocalling activity (e.g., high-high to low-low on a risk-volume grid, such as illustrated in FIG. 3, or other categorizations that may be defined, such as non-fraudulent robocalling, fraudulent robocalling, probing robocalling (e.g., probers looking for live numbers for making lists for additional threat activities), spoofed-number robocalling, etc.). In other examples, the type of network activity may comprise spoofing (e.g., non-robocalling related), phishing, SMS phishing (or "smishing"), other social engineering exploits, botnet activity, account fraud (e.g., including attempts at in-person transactions at retail locations of the telecommunication network operator, over-the-phone interactions with personnel of the telecommunication network operator, or the like), and so forth.

At step 460, the processing system implements a remedial action in response to an output of the prediction model indicating that the first phone number is associated with the type of network activity. The remedial action may include transmitting a notification to one or more network personnel (e.g., endpoint devices associated with network personnel that may be responsible for allowing or denying an in-person transaction at a retail location (such as obtaining a new endpoint device), network personnel who may be authorized to block or suspend telephone numbers, or the like). In one example, the remedial action may include locking or blocking access to a subscriber account, sending a code for two-factor authentication, sending a text message or email alerting an account owner of suspicious activity indicative of spoofing, account takeover or compromise, or the like, imposing increasing inter-call time gaps, and so on. In one example, the remedial action may comprise adding a label to the communication graph indicating the output of the prediction model (e.g., suspected robocaller, high volume-high risk robocaller, high volume-low risk robocaller, suspected live number prober, suspected SMS spammer, etc.). Notably, these labels may be used as additional input factors for various prediction models with respect to other phone numbers or other communications represented in the same or a different communication graph. For instance, for a given phone number, a prediction model may be more likely to classify the phone number as being a robocalling number when the phone number has communications with at least one other phone number that is labeled as a likely robocaller or that is a one hop connection to a labeled likely robocaller (and similarly with regard to other designations for various types of monitored network activities, e.g., malicious/threat activities, or other activities that are not necessarily harmful to other users but which may exceed the terms of use according to a subscriber agreement, etc.).

Following step 460, the method 400 ends in step 495.

It should be noted that method 400 may be expanded to include additional steps, or may be modified to replace steps with different steps, to combine steps, to omit steps, to perform steps in a different order, and so forth. For instance, in one example, the processing system may repeat one or more steps of the method 400, such as steps 410-450, steps 430-450, steps 410-460, steps 430-460, etc. for additional time periods over which phone numbers and/or specific calls or calling patterns may be analyzed for association with one or more types of network activity. In one example, step 450 may generate multiple vectors and step 450 may include applying the multiple vectors to a plurality of prediction models for predicting/classifying different types of network activity and or categories associated therewith, such as a first prediction model for predicting associations with robocalling activities, a second prediction model for predicting associations with SMS botnet activity, e.g., SMS phishing or "smishing," etc. Alternatively, or in addition, a same vector from step 450 may be input to different prediction models. In one example, the method 400 may include training the prediction model in accordance with a training data set (e.g., groups/sets of input factors for phone numbers or calls for which labels have been applied). In one example, the method 400 may include retraining the prediction model, e.g., when a detected accuracy falls below a threshold accuracy, when the detected accuracy declines a certain percentage below an accuracy determined when the prediction model was deployed, etc. In one example, the method 400 may include generating the communication graph, e.g., prior to optional step 410 and/or prior to step 430. Thus, these and other modifications are all contemplated within the scope of the present disclosure.

In addition, although not specifically specified, one or more steps, functions, or operations of the method 400 may include a storing, displaying, and/or outputting step as required for a particular application. In other words, any data, records, fields, and/or intermediate results discussed in the method 400 can be stored, displayed and/or outputted either on the device(s) executing the method 400, or to another device or devices, as required for a particular application. Furthermore, steps, blocks, functions, or operations in FIG. 4 that recite a determining operation or involve a decision do not necessarily require that both branches of the determining operation be practiced. In other words, one of the branches of the determining operation can be deemed as an optional step. In addition, one or more steps, blocks, functions, or operations of the above described method 400 may comprise optional steps, or can be combined, separated, and/or performed in a different order from that described above, without departing from the examples of the present disclosure.

Figure 5:
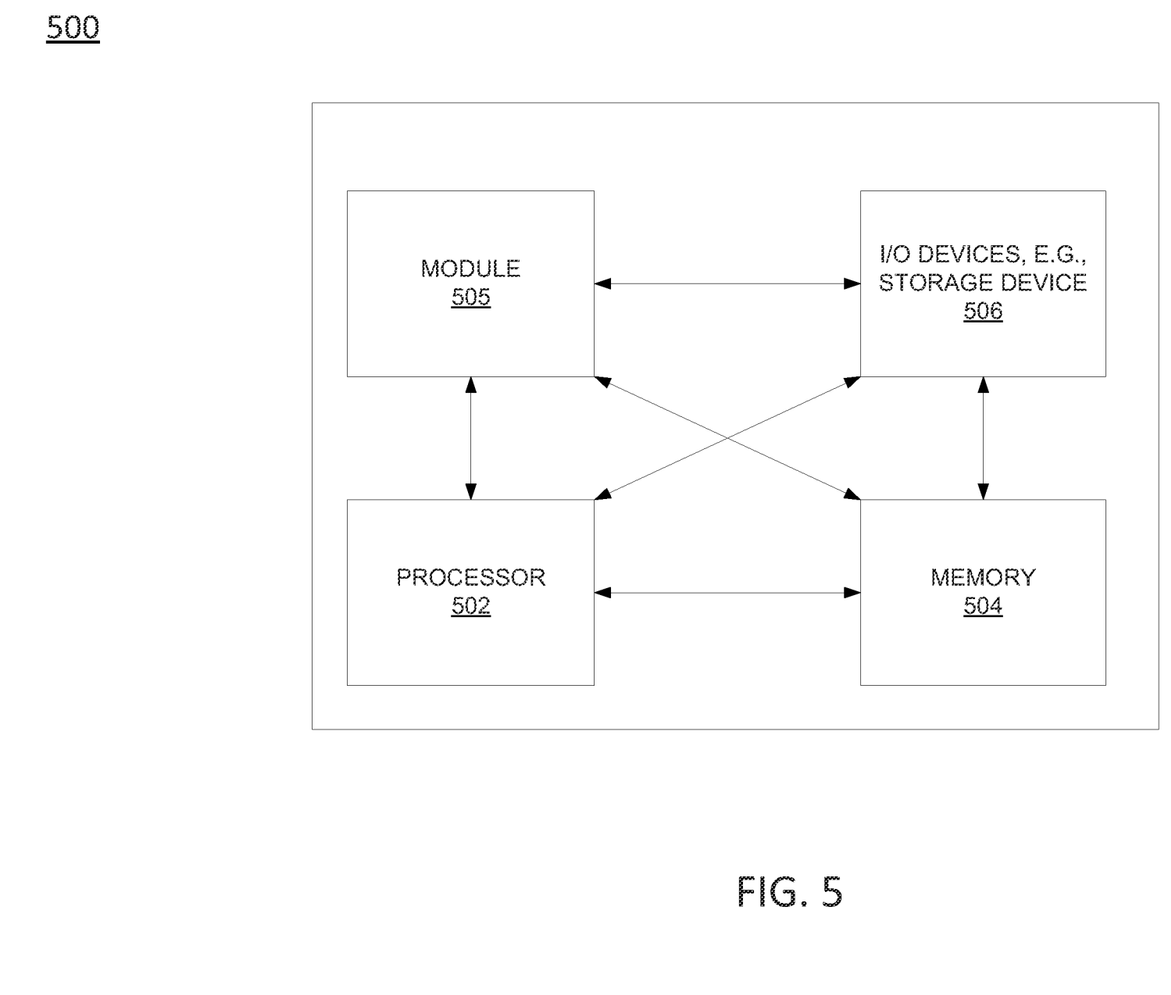
FIG. 5 illustrates a high-level block diagram of a computing device specially programmed to perform the functions described herein.

FIG. 5 depicts a high-level block diagram of a computing system 500 (e.g., a computing device, or processing system) specifically programmed to perform the functions described herein. For example, any one or more components or devices illustrated in FIG. 1, or described in connection with the examples of FIGS. 2-4 may be implemented as the computing system 500. As depicted in FIG. 5, the computing system 500 comprises a hardware processor element 502 (e.g., comprising one or more hardware processors, which may include one or more microprocessor(s), one or more central processing units (CPUs), and/or the like, where hardware processor element may also represent one example of a "processing system" as referred to herein), a memory 504, (e.g., random access memory (RAM), read only memory (ROM), a disk drive, an optical drive, a magnetic drive, and/or a Universal Serial Bus (USB) drive), a module 505 for identifying a phone number associated with a type of network activity via application of a vector generated via a graph embedding process applied to a communication graph as an input to a prediction model, and various input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 502 is shown, it should be noted that the computing device may employ a plurality of hardware processor elements. Furthermore, although only one computing device is shown in FIG. 5, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of FIG. 5 is intended to represent each of those multiple computing devices. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor element 502 can also be configured or programmed to cause other devices to perform one or more operations as discussed above. In other words, the hardware processor element 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 505 for identifying a phone number associated with a type of network activity via application of a vector generated via a graph embedding process applied to a communication graph as an input to a prediction model (e.g., a software program comprising computer-executable instructions) can be loaded into memory 504 and executed by hardware processor element 502 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for identifying a phone number associated with a type of network activity via application of a vector generated via a graph embedding process applied to a communication graph as an input to a prediction model (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
    maintaining, by a processing system including at least one processor, a communication graph that includes nodes representing a plurality of phone numbers including a first phone number and edges between the nodes representing a plurality of communications between the plurality of phone numbers;
    generating, by the processing system, at least one vector via a graph embedding process applied to the communication graph, the at least one vector representing features of at least a portion of the communication graph;
    applying, by the processing system, the at least one vector to a prediction model that is implemented by the processing system and that is configured to predict whether the first phone number is associated with a type of network activity associated with a telecommunication network; and
    implementing, by the processing system, a remedial action in response to an output of the prediction model indicating that the first phone number is associated with the type of network activity.

2. The method of claim 1, further comprising:
    obtaining the first phone number associated with a telecommunication network.

3. The method of claim 1, further comprising:
    identifying a plurality of communications between the first phone number and other phone numbers of the plurality of phone numbers.

4. The method of claim 3, wherein the plurality of communications is identified in accordance with a plurality of call detail records of the telecommunication network.

5. The method of claim 1, wherein the plurality of communications includes at least one of: phone calls or text messages.

6. The method of claim 1, wherein the maintaining of the communication graph includes generating the communication graph.

7. The method of claim 1, wherein the maintaining of the communication graph includes a two-hop expansion or a three-hop expansion of the communication graph from a node representing the first phone number.

8. The method of claim 1, wherein the edges represent aggregations of the plurality of communications over a period of time.

9. The method of claim 1, wherein the maintaining of the communication graph includes:
aggregating communications of the plurality of communications between phone numbers associated with two nodes; and
assigning at least one value to an edge between the two nodes based upon the communications that are aggregated.

10. The method of claim 1, wherein each edge of the edges is labeled with a trusted status between two phone numbers represented by two nodes connected via the edge, wherein the trusted status is at least one of: a trusted label or an untrusted label.

11. The method of claim 1, wherein the graph embedding process is trained as part of the prediction model or is trained as a separate process from the prediction model.

12. The method of claim 11, wherein the at least one vector encodes information about at least one of: the nodes or at least one of the edges between two of the nodes.

13. The method of claim 1, wherein the communication graph is a monopartite graph that is projected from a k-partite graph comprising additional nodes of at least one type other than a phone number type.

14. The method of claim 13, wherein the k-partite graph includes sub-graphs comprising at least one of: the communication graph or an identity graph.

15. The method of claim 1, wherein the applying further comprises applying at least a portion of the communication graph to the prediction model as at least one additional input.

16. The method of claim 15, wherein the prediction model is trained to predict whether the first phone number is associated with a type of network activity associated with the telecommunication network in accordance with the at least one vector and the at least the portion of the communication graph.

17. The method of claim 1, wherein the type of network activity comprises a robocalling activity.

18. The method of claim 17, wherein the prediction model is configured to output a category associated with the robocalling activity.

19. A non-transitory computer-readable medium storing instructions which, when executed by a processing system including at least one processor, cause the processing system to perform operations, the operations comprising:
maintaining a communication graph that includes nodes representing a plurality of phone numbers including a first phone number and edges between the nodes representing a plurality of communications between the plurality of phone numbers;
generating at least one vector via a graph embedding process applied to the communication graph, the at least one vector representing features of at least a portion of the communication graph;
applying the at least one vector to a prediction model that is implemented by the processing system and that is configured to predict whether the first phone number is associated with a type of network activity associated with a telecommunication network; and
implementing a remedial action in response to an output of the prediction model indicating that the first phone number is associated with the type of network activity.

20. An apparatus comprising:
a processing system including at least one processor; and
a non-transitory computer-readable medium storing instructions which, when executed by the processing system, cause the processing system to perform operations, the operations comprising:
maintaining a communication graph that includes nodes representing a plurality of phone numbers including a first phone number and edges between the nodes representing a plurality of communications between the plurality of phone numbers;
generating at least one vector via a graph embedding process applied to the communication graph, the at least one vector representing features of at least a portion of the communication graph;
applying the at least one vector to a prediction model that is implemented by the processing system and that is configured to predict whether the first phone number is associated with a type of network activity associated with a telecommunication network; and
implementing a remedial action in response to an output of the prediction model indicating that the first phone number is associated with the type of network activity.

* * * * *